(12) United States Patent
Liang et al.

(10) Patent No.: US 11,069,340 B2
(45) Date of Patent: Jul. 20, 2021

(54) FLEXIBLE AND EXPANDABLE DIALOGUE SYSTEM

(71) Applicant: Microsoft Technology Licensing, LLC, Redmond, WA (US)

(72) Inventors: Percy Shuo Liang, Palo Alto, CA (US); David Leo Wright Hall, Berkeley, CA (US); Joshua James Clausman, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/974,650

(22) Filed: May 8, 2018

(65) Prior Publication Data
US 2018/0261205 A1 Sep. 13, 2018

Related U.S. Application Data

(63) Continuation-in-part of application No. 15/904,125, filed on Feb. 23, 2018, now Pat. No. 10,586,530.
(Continued)

(51) Int. Cl.
*G06F 40/35* (2020.01)
*G10L 15/06* (2013.01)
(Continued)

(52) U.S. Cl.
CPC .......... *G10L 15/063* (2013.01); *G06F 3/0482* (2013.01); *G06F 16/90332* (2019.01);
(Continued)

(58) Field of Classification Search
CPC .......... G10L 15/00; G10L 15/22; G06F 17/00
See application file for complete search history.

(56) References Cited

U.S. PATENT DOCUMENTS 5,995,918 A 11/1999 Kendall et al.
6,173,261 B1 1/2001 Arai et al.
(Continued)

FOREIGN PATENT DOCUMENTS

EP 1352317 A2 10/2003
EP 3374880 A1 9/2018
(Continued)

OTHER PUBLICATIONS

"Final Office Action Issued in U.S. Appl. No. 15/669,795", dated Jan. 7, 2019, 19 Pages.
(Continued)

*Primary Examiner* — Shreyans A Patel
(74) *Attorney, Agent, or Firm* — Alleman Hall Creasman & Tuttle LLP

(57) ABSTRACT

A system that allows non-engineers administrators, without programming, machine language, or artificial intelligence system knowledge, to expand the capabilities of a dialogue system. The dialogue system may have a knowledge system, user interface, and learning model. A user interface allows non-engineers to utilize the knowledge system, defined by a small set of primitives and a simple language, to annotate a user utterance. The annotation may include selecting actions to take based on the utterance and subsequent actions and configuring associations. A dialogue state is continuously updated and provided to the user as the actions and associations take place. Rules are generated based on the actions, associations and dialogue state that allows for computing a wide range of results.

20 Claims, 20 Drawing Sheets

Related U.S. Application Data

(60) Provisional application No. 62/503,248, filed on May 8, 2017, provisional application No. 62/462,736, filed on Feb. 23, 2017.

(51) Int. Cl.
| | | |
|---|---|---|
| *G10L 15/22* | (2006.01) | |
| *G06F 3/0482* | (2013.01) | |
| *G10L 15/19* | (2013.01) | |
| *G10L 15/02* | (2006.01) | |
| *G06F 16/9032* | (2019.01) | |
| *G06F 40/169* | (2020.01) | |

(52) U.S. Cl.
CPC ............ *G06F 40/169* (2020.01); *G06F 40/35* (2020.01); *G10L 15/02* (2013.01); *G10L 15/19* (2013.01); *G10L 15/22* (2013.01); *G10L 2015/0638* (2013.01)

(56) References Cited

U.S. PATENT DOCUMENTS

| | | | |
|---|---|---|---|
| 6,173,266 | B1 | 1/2001 | Marx et al. |
| 6,192,343 | B1 | 2/2001 | Morgan et al. |
| 6,292,771 | B1 | 9/2001 | Haug et al. |
| 6,430,551 | B1 | 8/2002 | Thelen et al. |
| 7,133,827 | B1 | 11/2006 | Gillick et al. |
| 7,698,136 | B1 | 4/2010 | Nguyen et al. |
| 7,725,308 | B2 | 5/2010 | Russell |
| 7,933,774 | B1 | 4/2011 | Begeja et al. |
| 8,660,849 | B2 | 2/2014 | Gruber et al. |
| 8,706,486 | B1 | 4/2014 | Devarajan et al. |
| 9,104,754 | B2 | 8/2015 | Wedeniwski |
| 9,275,641 | B1* | 3/2016 | Gelfenbeyn ............ G10L 15/22 |
| 9,280,610 | B2 | 3/2016 | Gruber et al. |
| 9,318,109 | B2 | 4/2016 | Boies et al. |
| 9,348,805 | B1 | 5/2016 | Uszkoreit et al. |
| 9,390,087 | B1 | 7/2016 | Roux et al. |
| 9,495,331 | B2 | 11/2016 | Govrin et al. |
| 9,772,993 | B2 | 9/2017 | Braga et al. |
| 9,830,315 | B1 | 11/2017 | Xiao et al. |
| 10,042,844 | B2 | 8/2018 | Anand et al. |
| 10,319,381 | B2 | 6/2019 | Andreas et al. |
| 10,607,504 | B1 | 3/2020 | Ramanarayanan et al. |
| 2002/0032564 | A1 | 3/2002 | Ehsani et al. |
| 2002/0173955 | A1 | 11/2002 | Reich |
| 2003/0144055 | A1* | 7/2003 | Guo ............ G06T 13/40 |
| | | | 463/35 |
| 2004/0083092 | A1 | 4/2004 | Valles |
| 2004/0193420 | A1 | 9/2004 | Kennewick et al. |
| 2004/0236575 | A1 | 11/2004 | Goronzy et al. |
| 2005/0080629 | A1 | 4/2005 | Attwater et al. |
| 2005/0105712 | A1 | 5/2005 | Williams et al. |
| 2005/0197828 | A1 | 9/2005 | Mcconnell et al. |
| 2005/0278180 | A1 | 12/2005 | O'neill et al. |
| 2006/0106595 | A1 | 5/2006 | Brockett et al. |
| 2006/0122837 | A1* | 6/2006 | Kim ............ G10L 15/22 |
| | | | 704/270.1 |
| 2006/0123358 | A1 | 6/2006 | Lee et al. |
| 2006/0136227 | A1 | 6/2006 | Mizutani et al. |
| 2007/0174043 | A1 | 7/2007 | Makela |
| 2007/0185702 | A1 | 8/2007 | Harney et al. |
| 2008/0167876 | A1 | 7/2008 | Bakis et al. |
| 2008/0184164 | A1 | 7/2008 | Di fabbrizio et al. |
| 2009/0327263 | A1 | 12/2009 | Maghoul |
| 2010/0217597 | A1 | 8/2010 | Begeja et al. |
| 2011/0015925 | A1 | 1/2011 | Xu et al. |
| 2011/0295591 | A1 | 12/2011 | Fang et al. |
| 2011/0301943 | A1* | 12/2011 | Patch ............ G10L 15/265 |
| | | | 704/9 |
| 2012/0081371 | A1 | 4/2012 | Ozkaragoz et al. |
| 2012/0265534 | A1 | 10/2012 | Coorman et al. |
| 2013/0080167 | A1 | 3/2013 | Mozer |
| 2013/0111348 | A1 | 5/2013 | Gruber et al. |
| 2013/0185074 | A1 | 7/2013 | Gruber et al. |
| 2013/0275138 | A1* | 10/2013 | Gruber ............ G10L 13/00 |
| | | | 704/260 |
| 2013/0275899 | A1* | 10/2013 | Schubert ............ G06F 3/0481 |
| | | | 715/765 |
| 2014/0067375 | A1 | 3/2014 | Wooters |
| 2014/0142924 | A1 | 5/2014 | Friedman |
| 2014/0149112 | A1 | 5/2014 | Kalinli-akbacak |
| 2014/0180692 | A1 | 6/2014 | Joshi et al. |
| 2014/0278343 | A1 | 9/2014 | Tran |
| 2014/0316782 | A1 | 10/2014 | Tzirkel-hancock et al. |
| 2015/0032443 | A1 | 1/2015 | Karov et al. |
| 2015/0039292 | A1 | 2/2015 | Suleman et al. |
| 2015/0066479 | A1 | 3/2015 | Pasupalak et al. |
| 2015/0169758 | A1 | 6/2015 | Assom et al. |
| 2015/0179170 | A1 | 6/2015 | Sarikaya et al. |
| 2015/0364128 | A1 | 12/2015 | Zhao et al. |
| 2016/0034448 | A1 | 2/2016 | Tran |
| 2016/0048504 | A1 | 2/2016 | Narayanan |
| 2016/0062981 | A1 | 3/2016 | Dogrultan et al. |
| 2016/0078866 | A1 | 3/2016 | Gelfenbeyn et al. |
| 2016/0180853 | A1 | 6/2016 | Vanlund et al. |
| 2016/0188610 | A1 | 6/2016 | Bhatia et al. |
| 2016/0259767 | A1 | 9/2016 | Gelfenbeyn et al. |
| 2016/0260029 | A1 | 9/2016 | Gelfenbeyn et al. |
| 2016/0314791 | A1 | 10/2016 | Wang et al. |
| 2016/0322050 | A1* | 11/2016 | Wang ............ G10L 15/22 |
| 2016/0342702 | A1 | 11/2016 | Barve et al. |
| 2017/0148073 | A1* | 5/2017 | Nomula ............ G06F 16/957 |
| 2017/0228372 | A1 | 8/2017 | Moreno et al. |
| 2017/0300831 | A1 | 10/2017 | Gelfenbeyn et al. |
| 2017/0309149 | A1 | 10/2017 | Kaura |
| 2017/0316777 | A1* | 11/2017 | Perez ............ G06F 40/169 |
| 2017/0323636 | A1 | 11/2017 | Xiao et al. |
| 2017/0330077 | A1* | 11/2017 | Williams ............ G06F 17/278 |
| 2018/0061408 | A1 | 3/2018 | Andreas et al. |
| 2018/0114522 | A1 | 4/2018 | Hall et al. |
| 2018/0203833 | A1 | 7/2018 | Liang et al. |
| 2018/0246954 | A1 | 8/2018 | Andreas et al. |
| 2018/0293483 | A1 | 10/2018 | Abramson et al. |
| 2018/0350349 | A1 | 12/2018 | Liang et al. |
| 2019/0066660 | A1 | 2/2019 | Liang et al. |
| 2019/0103092 | A1 | 4/2019 | Rusak et al. |
| 2020/0193970 | A1 | 6/2020 | Liang et al. |

FOREIGN PATENT DOCUMENTS

| | | |
|---|---|---|
| WO | 2006016308 A1 | 2/2006 |
| WO | 2006037219 A1 | 4/2006 |
| WO | 2014015267 A2 | 1/2014 |
| WO | 2016114922 A1 | 7/2016 |

OTHER PUBLICATIONS

"Non Final Office Action Issued in U.S. Appl. No. 15/892,194", dated Feb. 25, 2019, 12 Pages.

"Non Final Office Action Issued in U.S. Appl. No. 15/904,125", dated Jul. 12, 2019, 15 Pages.

"Final Office Action Issued in U.S. Appl. No. 15/804,093", dated Sep. 4, 2019, 18 Pages.

"Non Final Office Action Issued in U.S. Appl. No. 15/804,093", dated May 13, 2019, 15 Pages.

Wang, et al., "Building a semantic parser overnight", In Proceedings of the Annual Meeting of the Association for Computational Linguistics, 2015, pp. 1332-1342.

"Non-Final Office Action Issued in U.S. Appl. No. 15/669,795", dated Jul. 11, 2018, 13 Pages.

"International Search Report Issued in PCT Application No. PCT/US2017/048384", dated Nov. 22, 2017, 6 Pages.

"International Search Report Issued in PCT Application No. PCT/US2017/058138", dated Jan. 5, 2018, 5 Pages.

"International Search Report & Written Opinion Issued in PCT Application No. PCT/US2017/060134", dated Jan. 29, 2018, 6 Pages.

"International Search Report Issued in PCT Application No. PCT/US2018/017465", dated May 2, 2018, 7 Pages.

(56) References Cited

OTHER PUBLICATIONS

"Notice of Allowance Issued in U.S. Appl. No. 16/036,622", dated Mar. 10, 2020, 10 Pages.
"Non Final Office Action Issued in U.S. Appl. No. 15/804,093", dated Feb. 4, 2020, 23 Pages.
"Final Office Action Issued in U.S. Appl. No. 15/892,194", dated Oct. 10, 2019, 11 Pages.
"Non Final Office Action Issued in U.S. Appl. No. 16/115,491", dated May 13, 2020, 15 Pages.
"Notice of Allowance Issued in U.S. Appl. No. 15/804,093", dated Jun. 18, 2020, 10 Pages.
"Supplementary Search Report Issued in European Patent Application No. 18756646.8", dated May 27, 2020, 8 Pages.
"Supplementary Search Report Issued in European Patent Application No. 17867628.4", dated May 15, 2020, 9 Pages.
"Supplementary Search Report Issued in European Patent Application No. 18751475.7", dated Apr. 20, 2020, 11 Pages.
"International Search Report & Written Opinion Issued in PCT Application No. PCT/US2018/019556", dated May 29, 2018, 10 Pages.
"Final Office Action Issued in U.S. Appl. No. 16/115,491", dated Oct. 13, 2020, 20 Pages.
"Non Final Office Action Issued in U.S. Appl. No. 16/115,491", dated Feb. 8, 2021, 21 Pages.
"Notice of Allowance Issued in U.S. Appl. No. 16/115,491", dated May 25, 2021, 10 Pages.
"Non Final Office Action Issued in U.S. Appl. No. 16/802,356", dated Mar. 31, 2021, 8 Pages.

\* cited by examiner 17. agent: There is a flight for the same price that gets back at 8:45 pm.
44. =((43.Flight).price,(34.Flight).price)
true (Boolean)

FIGURE 10

```
0: agent: I'm sorry, I cannot find a flight which arrives before it departs.
5: <([4:FlightSearch].parts.[0].departure_dates.[1],[4:FlightSearch].parts.[1].departure_dates.[1])
   false (Boolean)
6: note([5:Boolean])
```

FIGURE 11

1: user: I want to go to California

1: California:Location
California (Location)

2: destination
destination (String)

3: tag([1:Location],[2:String])
▸ (TaggedValue)
value: California (Location)
tag: destination (String)

2: agent: Where in California would you like to go?

FIGURE 12

0: user: I want a flight to Boston leaving tomorrow
0: create_flight_search()
   ▲ [FlightSearch] ext
1: Boston:City
   Boston (City)
2: get_airports([1:City])
   ▼ [List(Airport)]
   General Edward Lawrence Logan Intl (Airport)
3: get_airport_code([2:List][0])
   BOS (AirportCode)
4: [0:FlightSearch].parts.[0].destinations += identity([3:AirportCode])
   ▲ [FlightSearch] ext
5: now()
   2017-04-05 22:44 (Datetime)
6: get_date([5:Datetime])
   2017-04-05 (Datetime)
7: 1:Number
   1 (Number)
8: to_days([7:Number])
   1 days (Duration)
9: forward([6:Datetime],[8:Duration])
   2017-04-06 (Datetime)
10: [4:FlightSearch].parts.[0].departure_dates += identity([9:Datetime])
    ▲ [FlightSearch] *

End of dialogue

FIGURE 16

Some checks failed

The state has been annotated with failing checks. Please resolve them and re-validate the dialogue.

```
0: user: I want to fly to BOS
0: create_flight_search()
  ▲ {FlightSearch}
1: BOS.AirportCode
  BOS {AirportCode}
2: [0:FlightSearch].parts [0].destinations += identify([1:AirportCode])
  ▲ {FlightSearch}
1: agent: Ok, to Boston                         Possible entity 'Boston' not explained by the actions
* 3: identify([2:FlightSearch].parts [0].destinations, [1])
  BOS {AirportCode}
2: agent: where do you want to depart from?    Agent utterance is not capitalized
3: user: ORD
4: ORD.AirportCode
  ORD {AirportCode}
```

FIGURE 17

FLEXIBLE AND EXPANDABLE DIALOGUE SYSTEM

CROSS REFERENCE TO RELATED APPLICATIONS

The present application claims the priority benefit of U.S. provisional patent application No. 62/503,248, filed on May 8, 2017, titled "Flexible and Expandable Dialogue System," and is a continuation-in-part of U.S. patent application Ser. No. 15/904,125, filed on Feb. 23, 2018, titled "Expandable Dialogue System," which claims the priority benefit of U.S. provisional patent application No. 62/462,736, filed on Feb. 23, 2017, titled "Expandable Dialogue System," the disclosures of which are incorporated herein.

BACKGROUND

Prior art speech generation systems are not expandable in such a way as to allow non-expert administrators to expand the capability of the system. To the contrary, changes and modifications of prior art dialogue systems require significant engineering and developer resources and time. A general problem with goal-oriented dialogue systems, for example, that perform actions (those that query APIs) is that they are bound by constraints on composition and predefined dialogue patterns. Compositionality is important to supporting rich functionality from a few primitives. However, to limit the combinatorial explosion when learning from weak supervision, constrained grammars are typically employed. This means that many meanings are simply not expressible. What is needed is an improved dialogue system that does not require significant engineering resources as in prior art systems when expanding.

SUMMARY

The present technology, roughly described, is a system that allows non-engineers administrators, without programming, machine language, or artificial intelligence system knowledge, to expand the capabilities of a dialogue system. The dialogue system may have a knowledge system, user interface, and learning model. A user interface allows non-engineers to utilize the knowledge system, defined by a small set of primitives and a simple language, to annotate a user utterance. The annotation may include selecting actions to take based on the utterance and subsequent actions and configuring associations. The system can automatically process user input including and annotation input, such as by defining features on input, processing constraint violations, applying business logic to dialogue, inducing business logic rules from data, inserting tags into dialogue, auto-completing dialogue entry, performing dialogue checks, marginalizing actions, and other processing performed during the time or after input is received.

In embodiments, a method for expanding a dialogue system can automatically process user input to generate improved dialogue. Dialogue can be generated by an application on a server, wherein the dialogue consists of an utterance from a user and one or more actions that correspond to at least a portion of the utterance. Input can be received, from a user and by the application on the server, to complete at least one of the selected one or more actions. The application on the server can automatically process the received user input, such that the automatic processing is performed as part of an annotation process of a received user utterance. A representation of the dialogue state is maintained, the dialogue state including the utterance and the selected one or more actions. Rules are automatically generated based on the utterance, selected one or more actions, and the representation of the dialogue state.

BRIEF DESCRIPTION OF FIGURES

FIGS. 10-19 illustrate exemplary user interfaces for an expandable dialogue system.

DETAILED DESCRIPTION

The present technology provides a system that allows non-engineers administrators, without programming, machine language, or artificial intelligence system knowledge, to expand the capabilities of a dialogue system. The dialogue system may have a knowledge system, user interface, and learning model. A user interface allows non-engineers to utilize the knowledge system, defined by a small set of primitives and a simple language, to annotate a user utterance. The annotation may include selecting actions to take based on the utterance and subsequent actions and configuring associations. A dialogue state is continuously updated and provided to the user as the actions and associations take place. Rules are generated based on the actions, associations and dialogue state that allows for computing a wide range of results.

The expandable dialogue system described herein has advantages over systems of the prior art. Prior art speech generation systems are not expandable in such a way as to allow non-expert administrators to expand the capability of the system. A general problem with goal-oriented dialogue systems, for example, that perform actions in the world (those that query APIs) is that they are bound by constraints on composition and predefined dialogue patterns. Compositionality is important to supporting rich functionality from a few primitives. However, to limit the combinatorial explosion when learning from weak supervision, constrained grammars are typically employed. This means that many meanings are simply not expressible. Some examples that systems generally don't support are 'last week of December' or 'flight getting there at least 2 hours before the game starts'. Even single words like 'flight duration' require composition if only the start and end times are available; in that case, subtraction is required.

Prior dialogue systems do not have problem-solving capabilities. If there are no flights, prior art systems do not suggest alternatives. If there's ambiguity, prior art systems do not ask for clarifications. Prior art systems do not users for important information and handle customer support. Each of these patterns is generally coded as a dialogue pattern in prior art systems and fixed in code. To extend any of these capabilities in prior art systems requires engineers to spend substantial time developing code. There is a long tail of different phenomena, so this approach does not scale to real-world scenarios.

Figure 1:
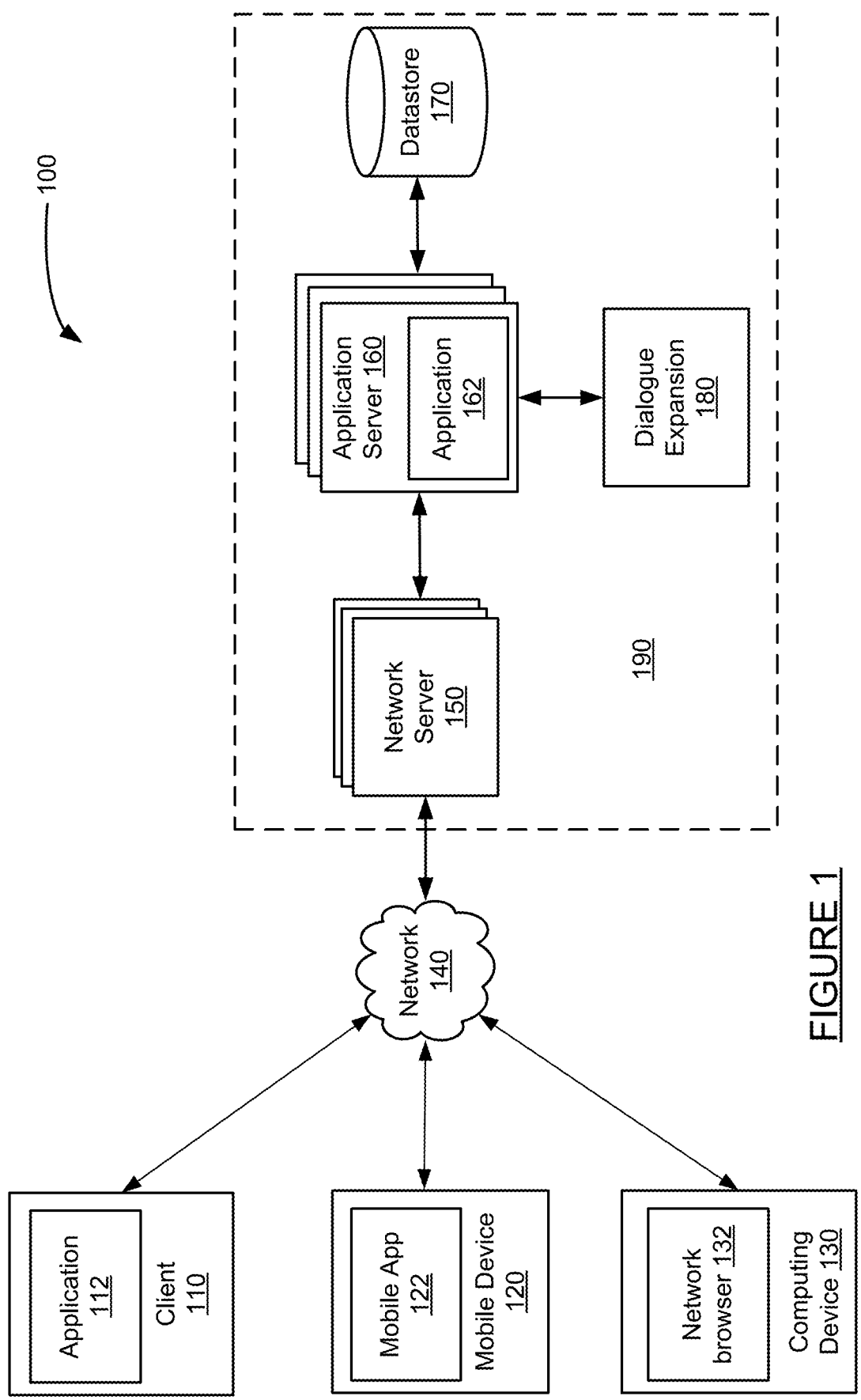
FIG. 1 is a block diagram of a system that implements dialogue expansion.

FIG. 1 is a block diagram of a system for providing a flexible and expandable dialogue system. System 100 of FIG. 1 includes client 110, mobile device 120, computing device 130, network 140, network server 150, application server 160, and data store 170. Client 110, mobile device 120, and computing device 130 communicate with network server 150 over network 140. Network 140 may include a private network, public network, the Internet, and intranet, a WAN, a LAN, a cellular network, or some other network suitable for the transmission of data between computing devices of FIG. 1.

Client 110 includes application 112. Application 112 may provide an automated assistant, TTS functionality, automatic speech recognition, parsing, domain detection, and other functionality discussed herein. Application 112 may be implemented as one or more applications, objects, modules, or other software. Application 112 may communicate with application server 160 and data store 170 through the server architecture of FIG. 1 or directly (not illustrated in FIG. 1) to access data.

Mobile device 120 may include a mobile application 122. The mobile application may provide the same functionality described with respect to application 112. Mobile application 122 may be implemented as one or more applications, objects, modules, or other software, and may operate to provide services in conjunction with application server 160.

Computing device 130 may include a network browser 132. The network browser may receive one or more content pages, script code and other code that when loaded into the network browser the same functionality described with respect to application 112. The content pages may operate to provide services in conjunction with application server 160.

Network server 150 may receive requests and data from application 112, mobile application 122, and network browser 132 via network 140. The request may be initiated by the particular applications or browser applications. Network server 150 may process the request and data, transmit a response, or transmit the request and data or other content to application server 160.

Application server 160 includes application 162. The application server may receive data, including data requests received from applications 112 and 122 and browser 132, process the data, and transmit a response to network server 150. In some implementations, the network server 152 forwards responses to the computer or application that originally sent the request. Application's server 160 may also communicate with data store 170. For example, data can be accessed from data store 170 to be used by an application to provide the functionality described with respect to application 112. Application server 160 includes application 162, which may operate similarly to application 112 except implemented all or in part on application server 160.

Block 190 includes network server 150, application server 160, data store 170, and dialogue expansion system 180. Dialogue expansion system 180 is in communication with application 162, and can communicate with other modules, programs, and machines of FIG. 1. The dialogue expansion system may be used to expand dialogue without requiring significant engineering or developer resources and time. Dialogue expansion 180 is discussed in more detail with respect to FIG. 2.

Figure 2:
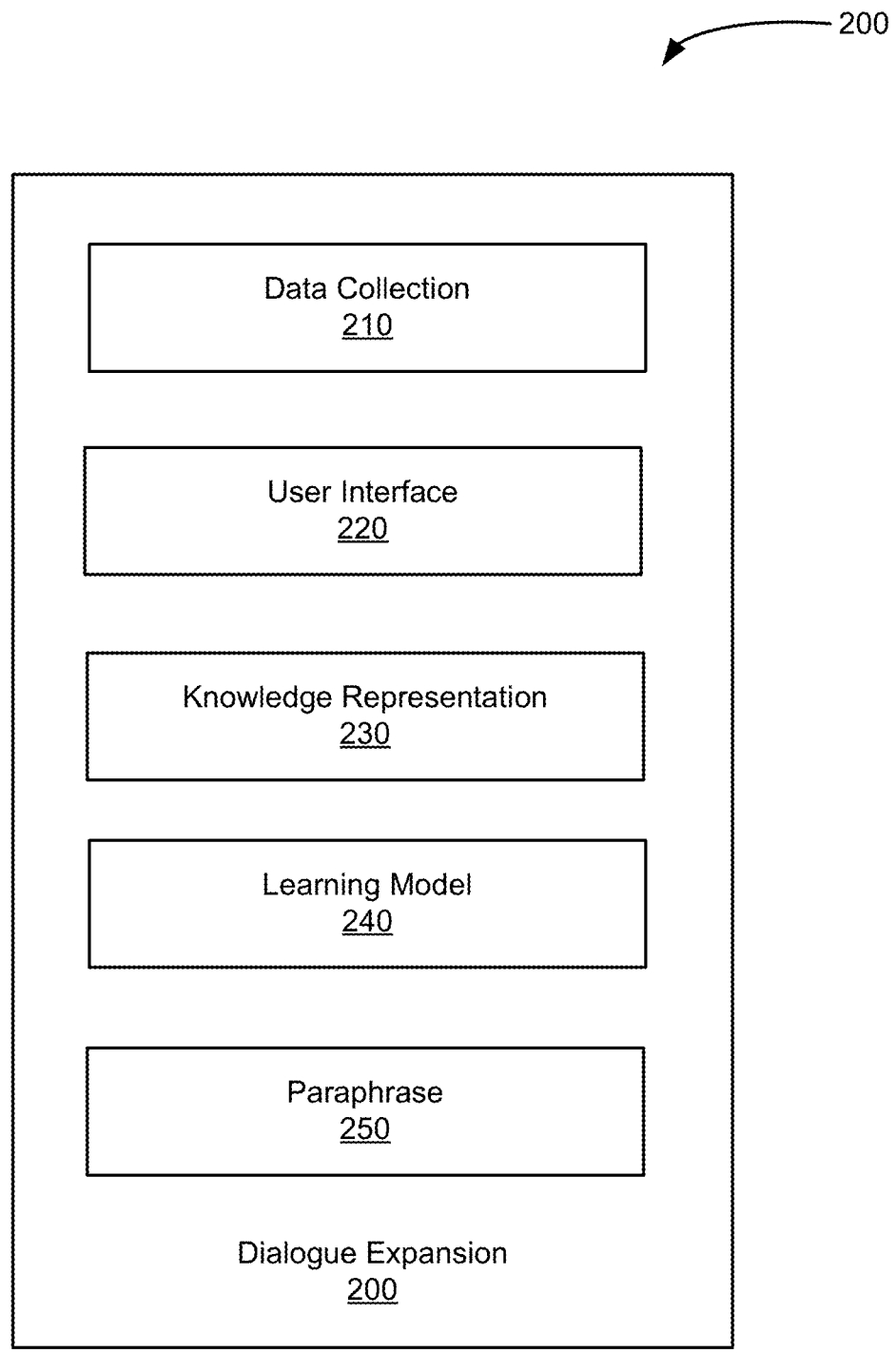
FIG. 2 is a block diagram of an exemplary dialogue expansion system.

FIG. 2 is a block diagram of an exemplary dialogue expansion system. The dialogue expansion system 200 of FIG. 2 provides more details for dialogue expansion application 180 of FIG. 1. Dialog expansion 200 of FIG. 2 includes modules of data collection 210, user interface 220, knowledge representation 230, learning model 240, and paraphrase 250. Each module of dialog expansion 200 may implement a component of the expandable dialogue system of the present technology.

Data collection module 210 may handle data collection by the expandable dialog system. The data collection may include collecting phrases in a given domain from annotators, collecting dialogue using a subset of phrases or something similar to the phrases, receiving annotations, and receiving and managing paraphrase annotated dialogues.

The user interface module 220 can provide and update a series of interfaces for receiving utterances, input, and other information, creating associations, and configuring actions, thereby allowing non-experts to create dialogues in a simple language. In some instances, a user may provide an utterance, select one or more actions, provide input, set forth associations, and perform other operations through user interface. Examples of user interfaces are discussed with respect to FIGS. 9-18.

Knowledge representation 230 may define a small set of primitives and a simple language that allows for computing a wide range of results. An exemplary knowledge representation module is discussed with respect to FIG. 3.

Learning model 240 can learn from this type of supervision to generalize to new dialogues. An exemplary learning model is discussed with respect to FIG. 3.

Below are a few example actions discussed herein to provide examples of the types of things which exist in the system. Each entry is of the form: action_name(input_1: input_type_1, . . . , input_n: input_type_n): output_type—description of the action create_flight_search( ): FlightSearch—Creates a new flight search for a round trip flight. This encapsulates the parameters for the search to be executed, not the results of the search.

to_entities(text: String): List—Resolves the provided text to a List of entities. The result is a heterogenous List. e.g. to_entities('Georgia') may resolve to a List containing both the state and country of Georgia.

get_airports(city: City): List—Finds the airports for a city. The result is a List of Airports.

get_airport_code(airport: Airport): AirportCode—Looks up the AirportCode for an Airport.

Paraphrase 250 may receive a text output or input and generate different words having a similar or same meaning of the words. The text output or input can be easier processed by a dialogue system or expandable dialogue system In addition to the actions associates with the flights domain, there are also many actions which are shared across domains and are common to achieving complex tasks. These include things such as: arithmetic operators, logical operators, list sort, list filter, list subset, list map and extract abstract path. There are also domains which are common to many applications which have shared functions such as monetary and date operations.

Though the dialog expansion 200 is illustrated with five modules 210-250, more or fewer modules may be included, included nested or sub-modules. Further, though the modules are described as operating to provide or construct the dialog expansion, other functionality described herein may also be performed by the modules. Additionally, all or part of the dialog expansion may be located on a single server or distributed over several servers.

Figure 3:
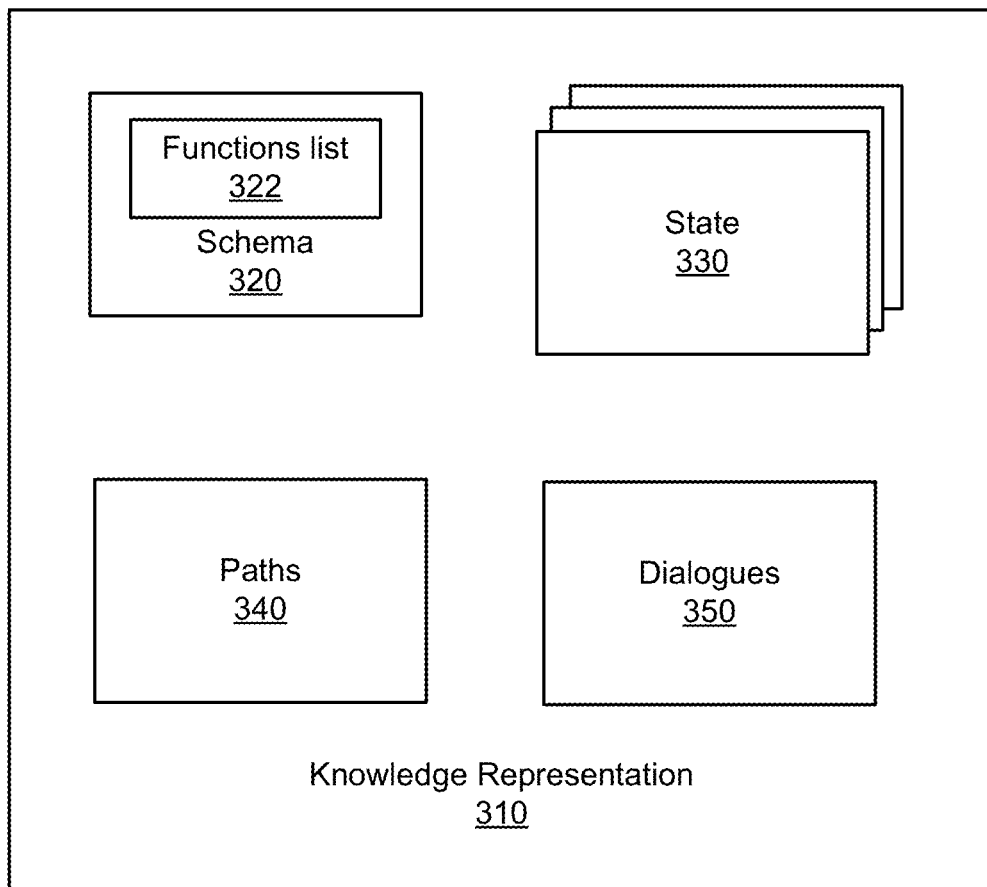
FIG. 3 is a block diagram of an exemplary knowledge representation module.

FIG. 3 is a block diagram of an exemplary knowledge representation 310. The knowledge representation of FIG. 3 provides more detail of module 230 of FIG. 2. The knowledge representation module consists of schema, state data, path, and dialogue data.

Schema 320 can include a list of functions, where each function can include a type signature (tuple of input types and an output type). The functions are primitives used to produce behaviors by a dialogue system. Examples of functions and type signatures include get_country:City→Country;
perform_flight_search:FlightSearch→List; and
concat:List, List→List.

A state 330 is a (list) value, which is either a primitive value such as an integer or a structured value. A structured value can contain an ordered list of fields (name, value) pairs. In some instances, this is used to represent dictionaries (with ordered keys) as well as lists (with null keys). Each state represents a scratchpad that the administrator and agent use to collaboratively construct the common ground and the results of the agent's actions.

A path 340 is a reference to a particular part of the state (e.g., when the state is implemented as a directory structure where the contents are ordered). Formally, a raw path can be a sequence of indices, such as [0].[0].[1]. When given a state, a path can be rendered by showing types at the top level and field names, such as for example as [0:FlightSearch].parts.[1].

A dialogue consists of a sequence of turns, where each turn consists of who is talking (e.g., an agent or an administrator), an utterance, and a sequence of actions. An utterance may be divided into a sequence of tokens and a set of paraphrases. For example, from the utterance "I'd like to fly to Boston," a sequence of actions may be create_flight_search( ), BOS: AirportCode, and [0:FlightSearch].parts.[0]. destinations+=_. Each action takes a state (list of values) and produces another value. Actions may be primitive actions or call actions.

A primitive action (type, contents) adds the value contents with given type (e.g., string, date) to the end of the state (e.g.e, BOS: AirportCode). A call action (function, in_paths, out_path, append, out_field, condition_path), to a first order approximation, extracts the values sitting at in_paths, passes them as inputs into the function and returns the value.

There are several additional complexities that can be implemented by knowledge module 310. In some instances, if out_path is non-empty, then the present system can take the value at the first element of out_path, and return the version of this that has out_path inside it updated. For example, for [0:FlightSearch].parts[0]. latest_departure_time=get_time([1:Datetime]), the present system would take the FlightSearch object, set the latest_ departure_time field and then return the object. The present system can maintain immutability.

If append is true, then we append the output of the function for example [0:FlightSearch].parts.[0].departure_ dates+=[2:Datetime].

In some instances, the present technology appends not to a list but a structured field, in which case out_field should be filled too.

In some instances, paths can contain wildcards in them, in which the action is applied on all paths that match these. For example, "[0:FlightSearch].parts.*.permitted_airlines+=[4: AirlineCode]" performs the action for all parts of the search. In some instances, terminology may be used that lets the base nodes be the ones matched by the lowest node that contains all the wildcards of out_path.

If condition_path is set, then the present technology can get a Path p from this path, and then perform the action on all base nodes such that following p from the base node leads to a true boolean value.

In summary, the present technology includes a defined programming language which maintains an infinite register machine where each action produces a new value, and any value can be used for later computation. Each action can perform a 'foreach' and an 'if' over base nodes.

Figure 4:
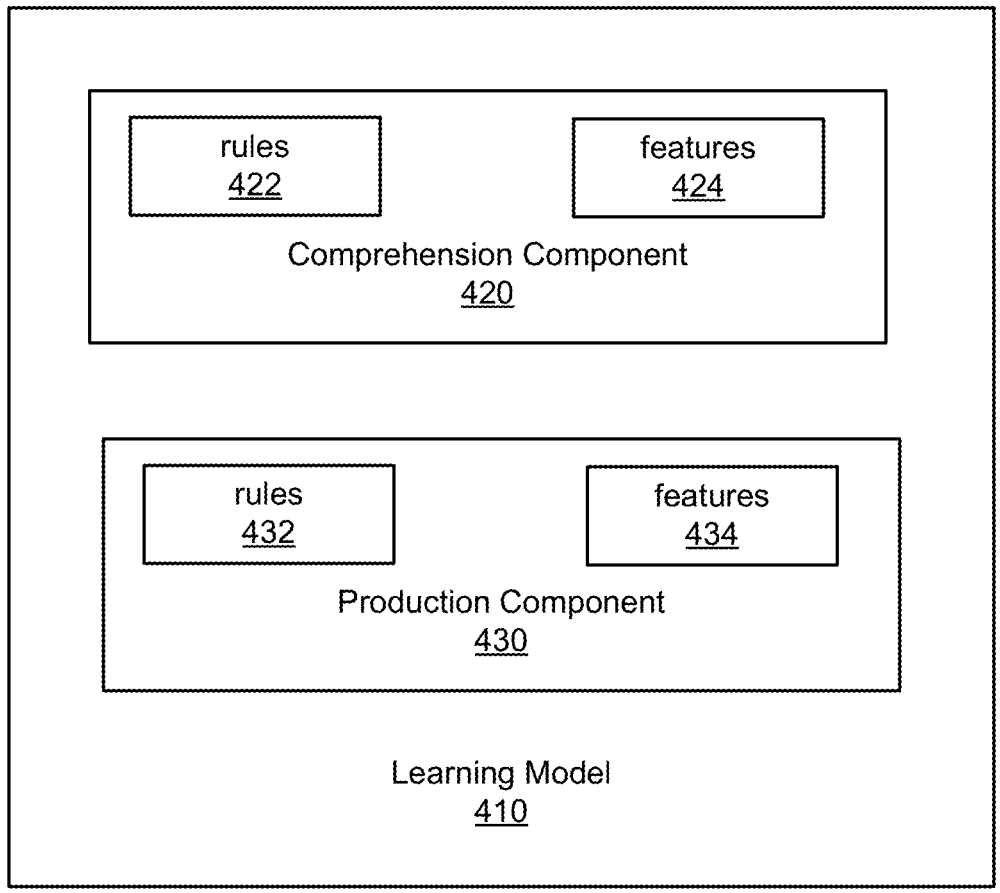
FIG. 4 is a block diagram of an exemplary learning model.

FIG. 4 is a block diagram of an exemplary learning model. The learning model 410 provides more detail for module 240 of FIG. 2. The learning model includes comprehension component 420 and production component 430.

The comprehension component converts context and a user utterance to a sequence of actions. The Production component converts context to a sequence of actions and an agent utterance. Each comprehension and production component can have rules and features—a structural part (set of rules) and a soft part (set of features). The purpose of the rules is to have relatively high recall. In some instances, the present technology can rely on a statistical model to rank the possible outputs. The comprehension rules can map sequences of tokens and categories to a sequence of actions. For example: "leaving before $Date($1)" results in [$1; FlightSearch[−1].parts.[0].latest_departure_time, Datetime [−1]). The production rules can map a pattern on the context to a sequence of actions and the natural language. For example: FlightSearch[−1].parts.[0].destination=null" produces "Where are you going?" Features, in some instances, can be simple and match various paths. Examples of feature include:

Phrase_was mentioned in the last utterance
The value at path_is_
Actions in turn_wrote to path_

Figure 5:
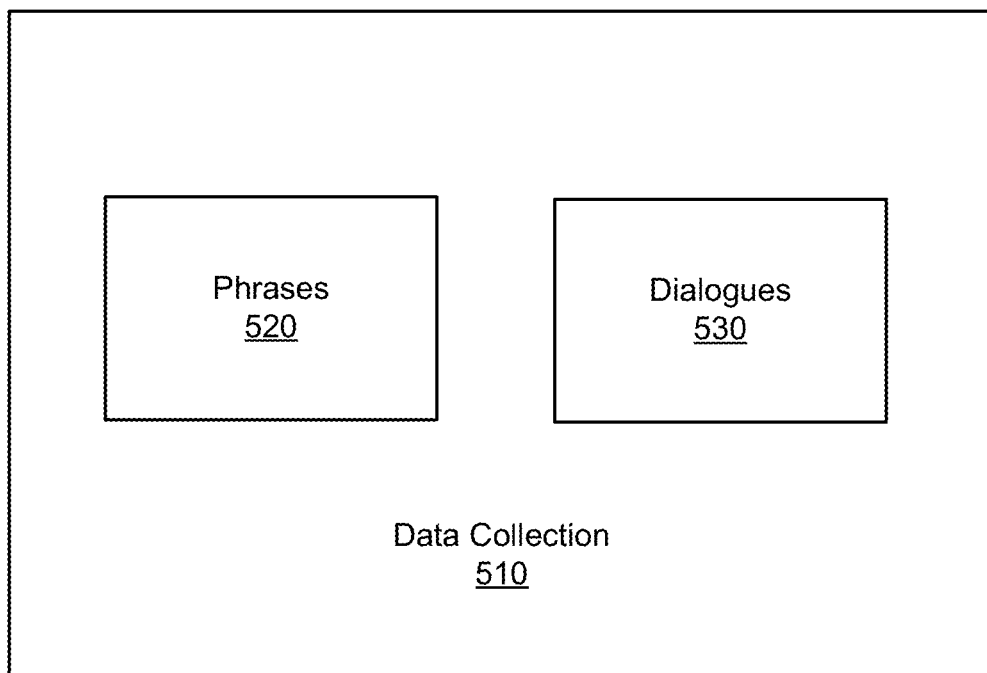
FIG. 5 is a block diagram of an exemplary data collection model.

FIG. 5 is a block diagram of an exemplary data collection model. Data collection 510 includes phrases 520 dialogues 530. The data collection module may implement a multi-tiered approach for data collection. In some instances, data collection module 510 may collect phrases and words of interest associated with a given domain, such as redeye, latest flight, no stops, layover, and other content associated with booking a flight. Data collection 510 may also construct dialogues from a subset of the phrases, where the dialogues use the phrases or something very similar to it the dialogues can be annotated with actions data collection module 510 may also provide paraphrase for annotated dialogues. The paraphrasing may be done given a bearing amount of context for the current dialogue.

In some instances, users or assistants can be used to perform certain tasks in collaboration with the present system. In some instances, the users may be considered teachers. In this instance, they may be three levels of teachers for three types of tasks: paraphrasing, dialogue sketchers, and dialog programmers. With respect to paraphrasing, the people should to be fluent in English (or the language of the dialogues) and be detail-oriented. A test may involve asking them to write examples of paraphrases and judge whether two sentences are paraphrases (they can't replace "Sunday" with "weekend").

Dialogue sketchers can include people may be both qualified as a customer service representative and able to simulate random things customers might do. The test may be to ask them to brainstorm different things a customer might do (to test their creativity in coming up with scenarios). The dialogues sketchers may ask them to respond as a customer service representative, and make sure that the response is professional and detail-oriented. These teachers could also be divided into user-side and agent-side.

Dialogue programmers can include people that need to have a "through mind," and know how to break down a high-level intent into primitive actions. The test for a dialogue programmer may be to give them something like "last week of May" and ask them to write down the steps of how to compute it. A programming background is helpful but not required. A dialogue programmer may also need to be able to debug: look at a sequence of steps and determine whether it computes the desired thing. In some instances, there can be a continuum between dialogue sketchers and dialogue programmers.

Figure 6:
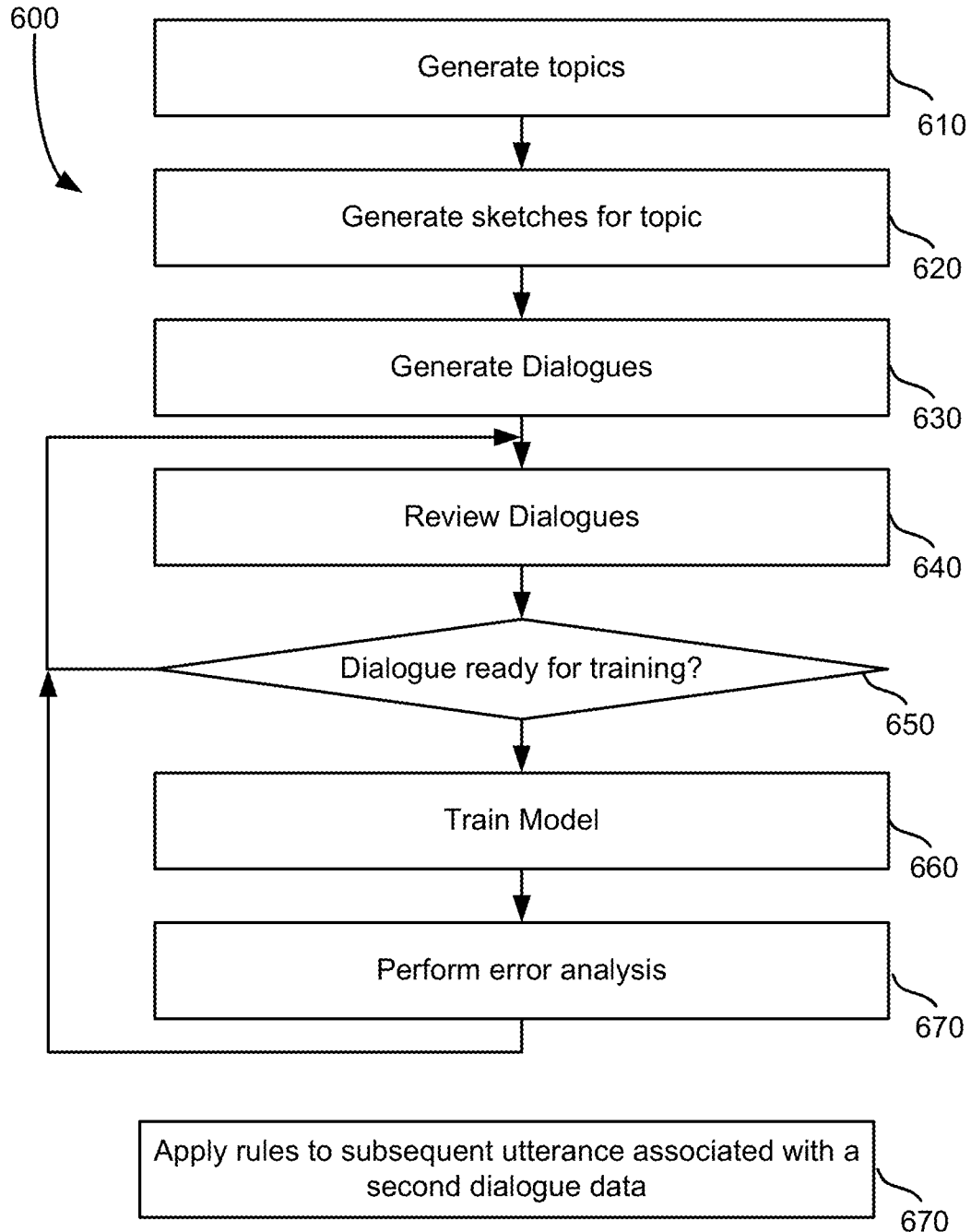
FIG. 6 is an exemplary method for expanding a dialogue system.

FIG. 6 is an exemplary method for expanding a dialogue system. The steps of FIG. 6 result in in the creation of dialogue data. First, topics may be generated at step 610. Generating topics may include topics that characterize types of user/agent interaction in a dialogue (e.g., asking about layovers). The topics can be created by anyone (in the company) who has an idea, as well as by AI teachers and developers in response to errors. These topics go into a software development tool, such as for example "JIRA," and are referred to as Dialogue Batches.

Sketches for topic can be generated at step 620. Dialogue sketchers brainstorm both the user and agent side of a dialogue and enter them into as a Dialogue in the software development tool, such as for example a Jira Data Board. In some instances, the sketch can include language only (between the agent and user), and does not include any actions. Each sketch is associated with a Dialogue Batch. When they a sketch is started, the dialogue is set to a Sketch In Progress state. When the sketch is completed, the dialogue is set to a Sketch Done state.

Dialogues are created at step 630. The dialogue sketches in the Sketch Done state are input into the dialogue expansion module, and any corresponding actions can be added as well. Generating dialogue can include accessing the user utterance, receiving and processing annotation data, and generating and displaying a representation of a dialogue state. When dialogue generation is complete, the dialogue with the corresponding actions can be set to a dialogue Done state. Generating dialogue is discussed in more detail with respect to the method of FIG. 7.

Once dialogue generation is complete, the dialogue is reviewed at step 640. In some instances, the dialogue may be reviewed using business logic and grammar rules. In some instances, one or more agents can act as reviewers of their peers' dialogues according to a set procedure.

A determination is made as to whether a dialogue is ready to be used for training at step 650. If the dialogues are ready to be used for training, a model can be trained with the dialogues at step 660. Once reviewed, dialogues with no errors are tagged as 'train'. Any dialogues with errors can be tagged accordingly, for example as 'review_found_error'. The original dialogue programmer or someone else can fix dialogue that is tagged as having one or more errors. When all errors for a dialogue have been fixed, the 'fixed' and 'train' tag can be added. If the dialogues have additional errors to be addressed the dialogue errors are reviewed further at step 640.

A model can be trained with the generated and reviewed dialogues at step 660. A lightweight training run can continuously take the old model weights and performs grammar induction to generate new rules. The training can be performed periodically, for example nightly or at some other time, or based on some event, such as an administrator request. A full training run can retrain all the weights and can generate an error report.

An error analysis is performed at step 670. The error analysis may include accessing one or more error reports and having one or more developers go through the errors in a visualization tool and recording the errors, for example by updating an error analysis spreadsheet. Some errors can require changes to the system, which can be made automatically or by an administrator. Some other errors are data errors, which can be addressed separately from system errors, for example by being added to a data errors spreadsheet with a special tag. By proceeding with an error review process, a reviewer can get feedback and become better over time.

Figure 7:
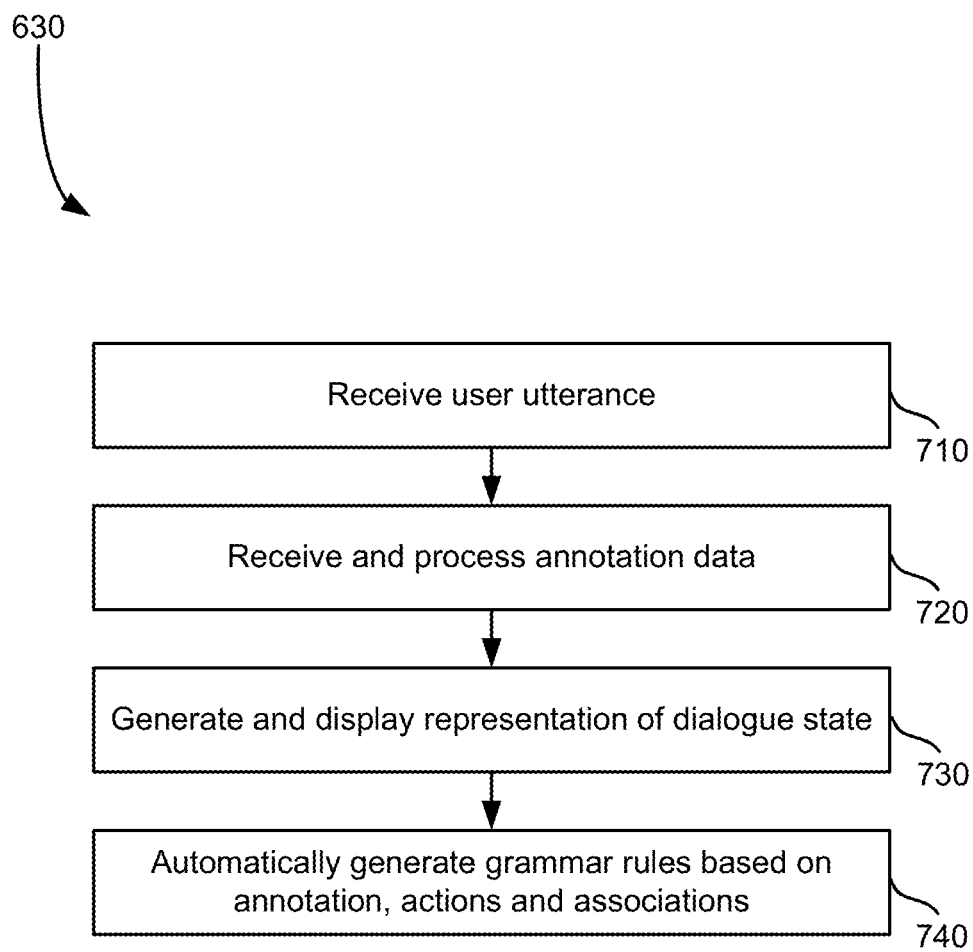
FIG. 7 is an exemplary method for generating dialogues.

FIG. 7 is an exemplary method for generating dialogues. The method of FIG. 7 provides more detail for step 630 of the method of FIG. 6. An utterance may be received at step 710. The utterance may be received from either the agent (the present technology) or the administrator that is expanding the system and may be received through a user interface provided by an application executing on a computing device. When received from the administrator, the utterance may be received as text or audio data.

Annotation data may be received and processed at step 720. The annotation data may be applied to the utterance, and/or may update the representation of the dialogue state. More details for receiving annotation data are discussed in more detail with respect to the method of FIG. 8.

A representation of the dialogue state may be generated and displayed at step 730. The dialogue state representation may indicate who is talking, and utterance, a sequence of actions, values for variables and fields in expressions, and other data concerning the dialogue.

Grammar rules may be automatically generated based on the annotation, actions and associations at step 740. The grammar rules may be generated by a learning model having a grammar induction functionality. Given a dialogue, the present system will derive a set of grammar rules and a set of features for each row. The provided associations are used as a signal as to which features are relevant and how to carve out user utterances and generalize across carved boundaries. Generation of the rules provides for expansion of the dialogue system by use of non-engineer and developer users.

Figure 8:
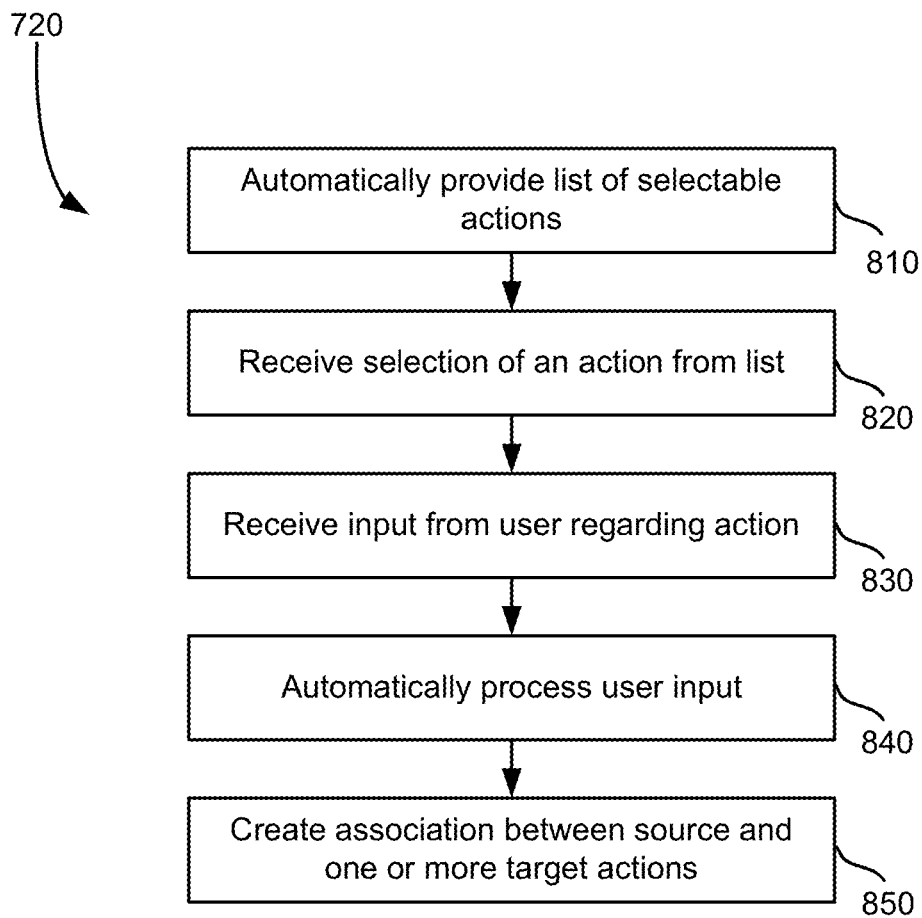
FIG. 8 is an exemplary method for receiving and processing annotation data.

FIG. 8 is an exemplary method for receiving and processing annotation data. The method of FIG. 8 provides more detail for step 720 of the method of FIG. 7. First, a list of selectable actions is automatically provided within an interface at step 710. The selectable actions are collected and displayed automatically based on the utterance or other user actions. A selection of an action from the list may be received at step 720. Input regarding the action may be received from the user at step 830. An action may be selected using a drop-down menu, placing a mouse over a particular action, or as some other input from the user. For example, user may indicate a name of a city, provided value, parameter, or some other data regarding action.

User input is automatically input at step 840. Automatically processing the input may include processing constraint violations, grammar induction, implement tagging of dialogue to generate actions, autocomplete functionality, dialogue validation, bulk migration, action marginalization, and other functionality. Automatically processing user input is discussed in more detail with respect to the method of FIG. 9.

An association between the source and or more target actions can be created at step 850. The association allows system to learn why it took a particular action, for example what word in an utterance triggered a particular action.

In some instances, the created associations provide a link between an utterance and certain actions and generations. An association has a source part and a target part. Each part of an association is either a span of an utterance, a subsequence of actions, or a path in the state. For example, for a larger sentence 'I want to leave tomorrow', an administrator might create the following association to define 'tomorrow':

Tomorrow: now(_); get_date( ); 1:Number; to_days(_); forward([3:Datetime], [4:Datetime])

When provided with a dialogue, the present dialogue system derives a set of grammar rules and a set of features for each rule. The present system uses the provided associations as a signal as to what features are relevant and how to carve up user utterances and generalize across the carved boundaries. For example, if the present system has an association from 'tomorrow' to a sequence of actions, then we can abstract that from the larger rule for 'leaving tomorrow'.

Tokens can be identified as "[leaving [tomorrow]]", wherein bracketing denotes source associations. Actions can be identified, for example, as follows: now( ); to_datetime ( ); 1; to_number( ); to_days( ); next(Datetime[−1], Duration [−1]); FlightSearch[−1].parts.[0].departure_dates+=_. This would induce the following rules:

leaving $Date=>$Root[$1; FlightSearch[−1].parts.[0].departure_dates+=_]

tomorrow=>$Date[now( ); to_datetime( ); 1; to_number ( ); to_days( ); next(Datetime[−1], Duration[−1])]

Figure 9:
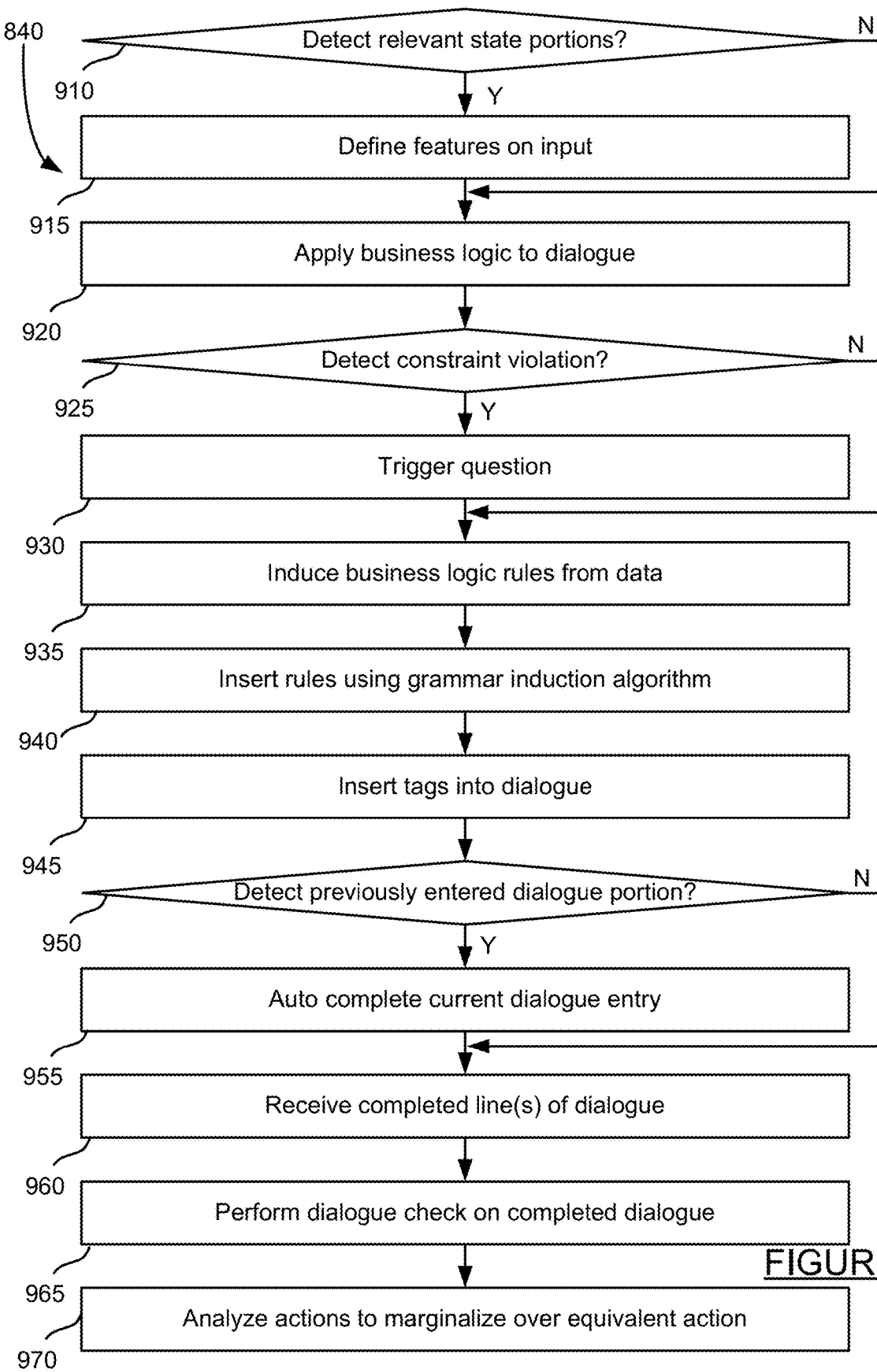
FIG. 9 is an exemplary method for automatically processing user input.

FIG. 9 is an exemplary method for automatically processing user input. In some instances, the method of FIG. 9 performs operations on dialogue, whether received as an utterance or annotated dialogue. The operations can, in some instances, be performed during or after a dialogue is received from a user or annotated. Though the steps of FIG. 9 are depicted in a particular order, the steps may be performed in a different order, as a subset of less than all the steps of FIG. 9, or not at all during processing of user input of an utterance or annotation.

A determination is made as to whether a relevant portion of a state is detected is detected at step 910. In some instances, a statistical model chooses between many possible candidate interpretations of a user utterance or agent utterances. Each candidate can consist of a sequence of actions, and typically a single candidate or subset of candidates is selected for further processing Determining a part of the context that is relevant for triggering the candidate can be extremely difficult to achieve and would normally involve lots of hand-coded features or a very heavily featured approach. Such an approach of prior systems does not generalize very well.

In some instances, annotators or the application, through intelligent analysis, can mark aspects of the state which are relevant. If relevant portions are detected at step 910, features can be defined on input received from user at step 915. For example, a marked portion can include prices of the two last flights and call the '=' function on it to produce the value true. FIG. 10 is an example of an interface to mark relevant state aspects as relevant. The presently disclosed expandable dialogue system statistical model can define features on the output, which is much simpler and more general. These features can be considered soft preconditions. In some instances, the marks of the state need only provide rough hints. When the marks don't produce the proper features, any fine tuning or correction is handled via learning in an end-to-end manner. If relevant portions are not detected at step 910, the method continues to step 920.

Business logic can be applied to dialogue at step 920. A determination is made as to whether a constraint violation is detected at step 925. A validator module and/or business logic may be used as part of the presently disclosed expandable dialogue system. A dialogue system can incorporate business logic rules and domain knowledge (e.g., a user can't book a flight yesterday; a user must depart before you arrive, etc.). If a constraint violation is detected, the method of FIG. 9 continues to step 930 at which a constraint violation can trigger a question or an error message. Normally, these rules would be encoded in the dialogue system itself. In presently disclosed expandable dialogue system, these business logic rules can be stated in a full context and mined from data as part of grammar induction. FIG. 11 is an interface to indicate important business logic for a constraint violation rule. Use of the business logic allows the present system to note a priori commit to a particular set of hard and fast rules, as rules can be contextual. By inducing rules from data, the present system mimicks case law. In some instances, the present system can add "assert" actions, to more forcefully declare (e.g., can't leave after arrive) certain preconditions when we have that prior knowledge. If no constraint violation is detected, the method of FIG. 9 continues to step 935.

Business logic rules can be induced from data at step 935. In some cases, it can be difficult to write down a precise set of actions that produce a desired behavior. A common case is definite references (e.g., the 10 am flight). While this could be treated by a detailed, explicit modeling of metonymy and implicit relations, it sometimes is easier to learn to select salient items in a soft way. When annotators input actions, they have the flexibility of just selecting things from context (for example, selecting the desired flight from the list and not explaining why this choice was made). The grammar induction algorithm will insert an action (e.g., select ("10 am", Flight)). This function can either be a simple deterministic heuristic or can be a learned module, and if there are multiple possibilities, different rules corresponding to inserting different actions can be added at step 940. In this manner, we avoid having the annotators produce tedious low-level annotations which might change, might be intrinsically not well-defined, or can be automatically inferred anyway.

In some instances, constraint solvers may be utilized by the present system. Dialogues can require some heavy-duty inference. For example, if it was desired to plan an itinerary that involved seeing 3 museums eating at 5 restaurants in some order, then the present system could use a constraint solver. In the presently disclosed expandable dialogue system, such solvers are treated as just any other function. The system can build up a CSP instance like FlightSearch, add constraints to it, and then call an action called 'solve', analogous to 'perform_flight_search'. In this manner, complex computations are reified in the context and exposed to the user, so the user can add/remove constraints as needed.

Tags can be inserted into dialogue at step 945. In some instances, for example for more complex dialogues, not all pieces of information can be put into the standard request structures which are based on API calls (e.g., FlightSearch). For example, "I want to go to California next week" or "I'm visiting my brother" may not be resolved immediately by setting departure dates, etc. In these cases, the present system can resolve the entities (e.g., "California" to the entity, "next week" to particular dates) within an utterance or dialogue and insert various tags ("destination", "trip_date"). The dialogue system an utilize features to look at the relevant entities and their tags to govern downstream actions (e.g., having a sub-dialogue about where in California). FIG. 12 is an interface for using a tag function to indicate association. Tags as used by the present system, in some instances, can be open-ended and form a folksonomy, similar to hashtags in social media. Therefore, tags in the present system can be extended very easily (therefore fulfilling the goal of unbounded capacity), while still providing structure: they are hints to the learning algorithm that two perhaps seemingly disparate situations are actually similar.

The present system can also provide an auto-complete feature. A determination can be made as to whether a previously entered dialogue portion is detected from an annotator or other user at step 950. The portion may be in the process of being entered by the annotator/user. The canonical way to enter dialogues of the present technology is to write utterances paired with actions. However, many of these actions will have overlap with existing dialogues. There are two ways the present technology uses autocomplete to minimize annotator effort. First, when the user types an utterance, if this utterance can already be interpreted by our system, then the present system immediately produce the set of actions. It is important to note that this is possible because a data collection tool of the present system is based on a full dialogue system. Hence, as the dialogue system gets better, collecting a new dialogue should be converging to the effort it takes to have a dialogue with a system.

Figure 13:
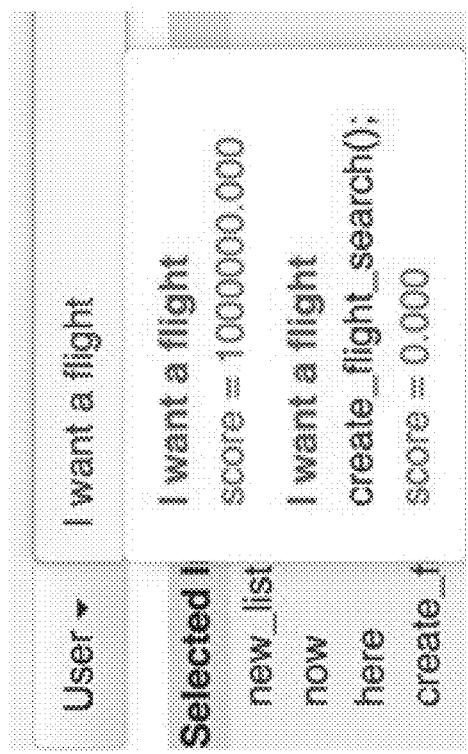

FIGS. 13-16 are a series of interfaces with an autocomplete feature. In FIG. 13, a second option, with score=0.000, will execute the action 'create_flight_search( )' when selected.

The second way to utilize autocomplete to minimize annotator effort can be used when the system cannot understand the user. In this situation, the present system may launch or execute an 'Interpret' mode, in which the user can explain the more complex utterance in terms of simpler utterances that the system can understand. For example, if the system doesn't understand 'I want a flight to Boston leaving tomorrow', the annotator can break this sequence or utterance down into sub-portions such as 'I want a flight to Boston', which creates the FlightSearch and sets the destination to airports in Boston; followed by 'tomorrow', which can get resolved to the actual date, and then perform one action to put that date into the departure date.

Figure 14:
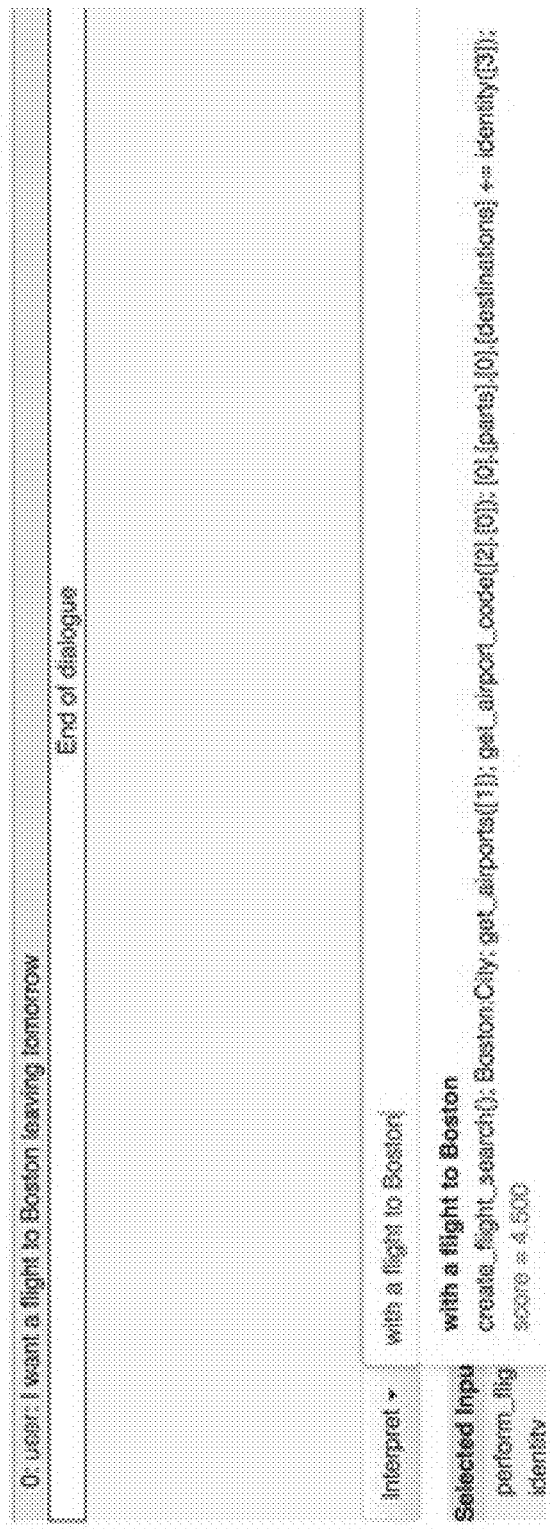

In FIG. 14, an Interpret mode is used via a drop down menu to explain the complex utterance of "I want a flight to Boston leaving tomorrow." The Interpret module handles the user utterance portion of "I want a flight to Boston." Selecting the shown autocomplete option will add the necessary actions to the state to handle this utterance/annotation portion.

Figure 15:
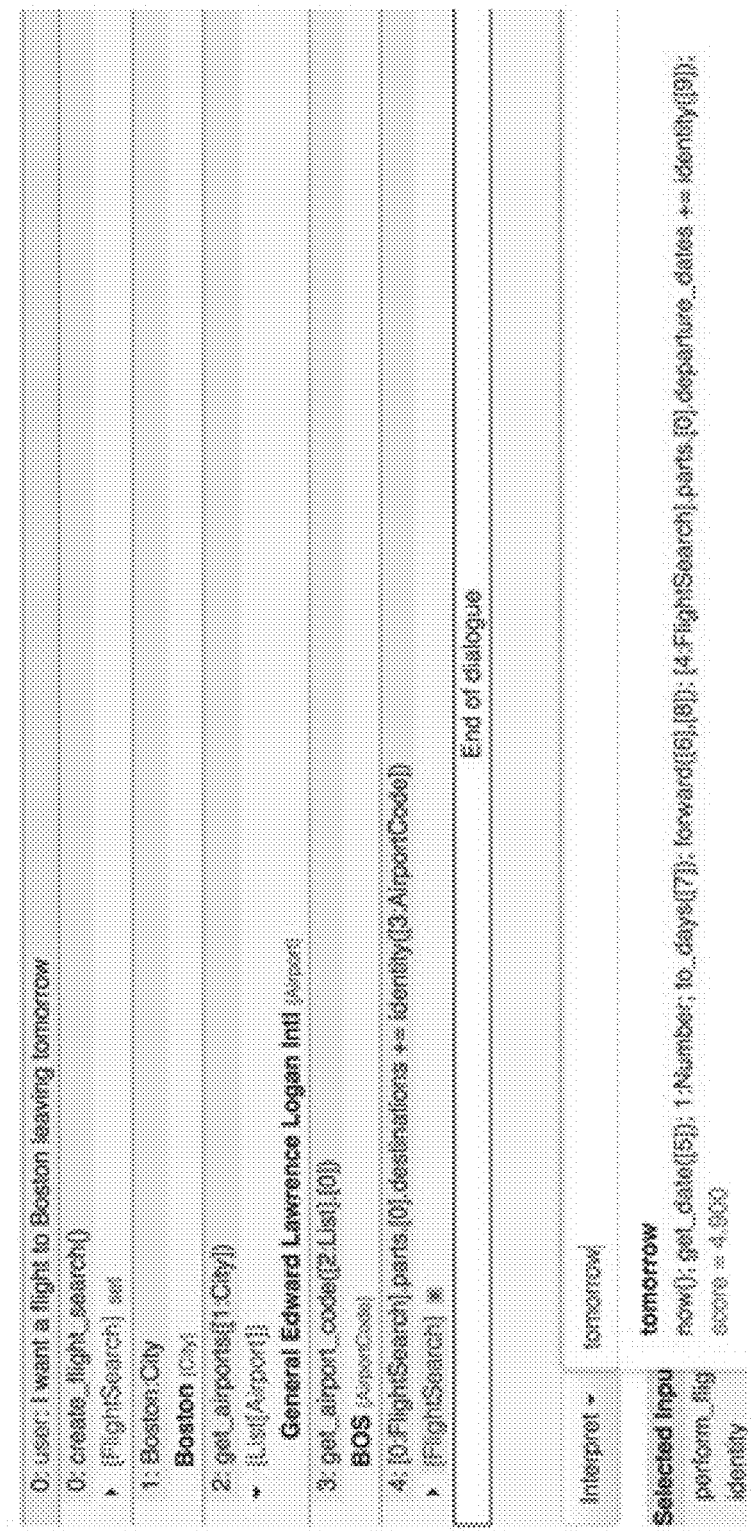

In FIG. 15, the state has been updated with the actions and values from the preceding FIG. 14. In FIG. 15, the Interpret mode is being used to handle the part "tomorrow" of the original user utterance. Selecting the shown autocomplete option will add the necessary actions to the state to handle this part.

In the interface of FIG. 16, the state has been updated with the actions and values from the preceding FIG. 15. In FIG. 16, the entire initial user utterance of "I want a flight to Boston leaving tomorrow" has been handled by decomposing it into two Interpret requests. The actions shown are the results of using autocomplete for this decomposition task and are the same actions as would be present had the system been able comprehend the initial utterance.

The creation of dialogues, while easier than programming, is nonetheless a cognitively non-trivial task which is prone to error. The present system may perform a checking process on dialogue. Completed lines of dialogue are received at step 960 and a dialogue check is performed on the completed dialogue at step 965.

In some instances, when the annotator finishes creating a dialogue, he or she can execute a process to 'validate' dialogue by executing the dialogue checker and identify problems, which can be fixed in real time.

The dialogue checker can consist of several pieces. It identifies stylistic problems with the utterances, identifies mis-alignment, and identifies close matches. It can also identify possible mis-alignment between the utterance and the actions. For example, if entities such as 'San Francisco' are mentioned in the utterance but not in the actions, then there is a possible omission.

Additionally, the dialogue checker identifies close matches between rules mined from the dialogue which differ in subtle ways to rules mined from other dialogues. The present system uses a trained model to check existing dialogues; any errors and mismatches that are found are interpreted not necessarily as deficiencies in the model, but as potential errors in the data. The reason is that learning strives for consistency, and any inconsistencies are potential problems to look at. Note that in checking a dialogue, the present technology performs grammar induction on that dialogue itself to see how the system might generalize.

In the interface of FIG. 17, the dialogue checker updates the view with possible errors in the dialogue. In FIG. 17, the two errors marked are that 'Boston' is in the agent utterance, but is never explained by the actions. The second is that all agent utterances should be capitalized and one of them is not.

Figure 18:
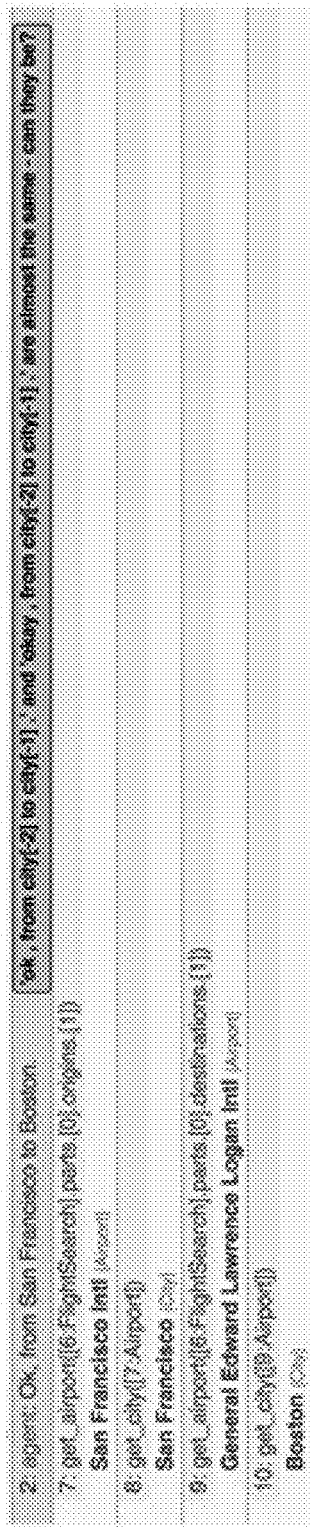

In the interface of FIG. 18, the dialogue checker finds a rule mined from the dialogue which is a close match to rules mined from other dialogues. In this case, most dialogues use the word 'Okay' but this dialogue is using the word 'Ok'. These checks help the present system normalize agent utterances which eases the burden of training.

Returning to the method of FIG. 9, actions can be analyzed to marginalize over equivalent actions at step 970. In some instances, there are many actions that can produce the same result (e.g., x=3; y=3 versus x=3; y=x). It is difficult to get annotators to be able to generate the consistent set of actions. However, the present system has the model marginalize over all the actions that are "equivalent". In some instances, equivalence is defined by checking that the actions produce the same set of important values, where important values are ones that are used downstream. Because of the rich-gets-richer phenomenon in latent-variable modeling, it only matters that the plurality of the instances of a given phenomenon are produced by the right sequence of actions. In the other cases, one can just produce the right actions for the wrong reasons. This reduces the amount of cognitive load on annotators as they are trying to produce the dialogues, and focusing on producing the right values.

The present technology may implement a bulk migration mechanism. Migration can be an issue for dialogue systems: not only do errors have to be fixed, but systems also have to change data to differences in behavior (e.g., having more or less implicit confirm). Having the presently disclosed expandable dialogue system be data-driven is convenient for performing migrations, because the system can stay grounded to actual examples (which is easier to have annotators perform these migrations), and it can be done incrementally. The presently disclosed expandable dialogue system can allow annotators and model developers to search through dialogues using a pattern-matching language. Then one can write a transformation rule to apply to those examples and see the resulting dialogues. These changes can be undone and further modified if desired.

Figure 19:
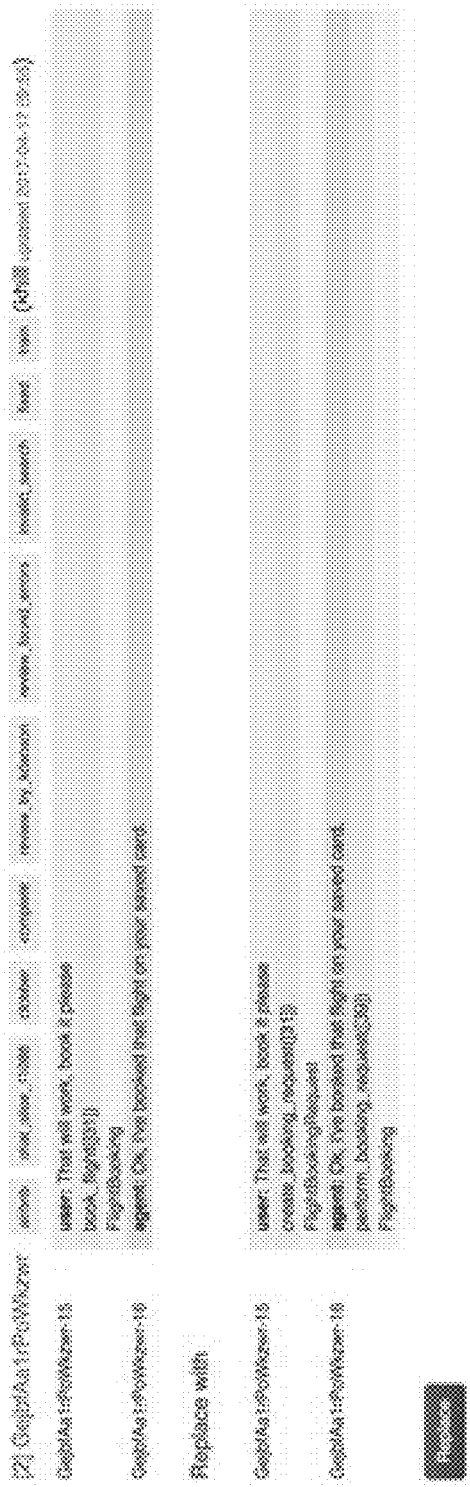

In the interface of FIG. 19, the migration tool is used to split a flight booking into two parts, the creation of a booking request and the execution of the booking request. The top utterances and actions are the affected part of the dialogue before the proposed migration is applied. The bottom utterances and actions are the same part of the dialogue, but after the proposed migration is applied. This visualization allows users to sanity check changes before applying them, allowing them to rapidly iterate on migrations.

The present system also includes a grammar induction mechanism. Learning and adapting to users very quickly is important, because it is impossible to forsee all the possible ways that someone might interact with a dialogue system. When users encounter an error, the present technology can have an annotator create a dialogue around this error. The present technology can have a set of annotators who are always active 24-7, who can be monitoring user behavior and adding examples. Given new examples, the present technology can perform grammar induction (which is very fast)+some simple weight initialization to be able to support that capacity. Since this is fast, the present technology can run this lightweight process continually. Every night, the present technology retrain the entire model to get a fine-tuned system.

The dialogue system of the present technology can be implemented by one or more applications, implemented on a mobile device of the user, on remote servers, and/or distributed in more than one location, that interact with a user through a conversation, for example by texting or voice. The application(s) may receive and interpret user speech or text, for example through a mobile device microphone or touch display. The application can include logic that then analyzes the interpreted speech or text and perform tasks such as retrieve information related to the input received from the user. For example, if the user indicated to the executing application that the user wanted to purchase a TV, the application logic may ask the user if she wants the same TV as purchased before, ask for price information, and gather additional information from a user. The application logic can make suggestions based on the user speech and other data obtained by the logic (e.g., price data). In each step of the conversation, the application may synthesize speech to share what information the application has, what information the user may want (suggestions), and other conversations. The application may implement a virtual intelligent assistant that allows users to conduct natural language conversations to request information, control of a device, or perform tasks. By allowing for conversational artificial intelligence to interact with the application, the application represents a powerful new paradigm, enabling computers to communicate, collaborate, understand our goals, and accomplish tasks.

Figure 20:
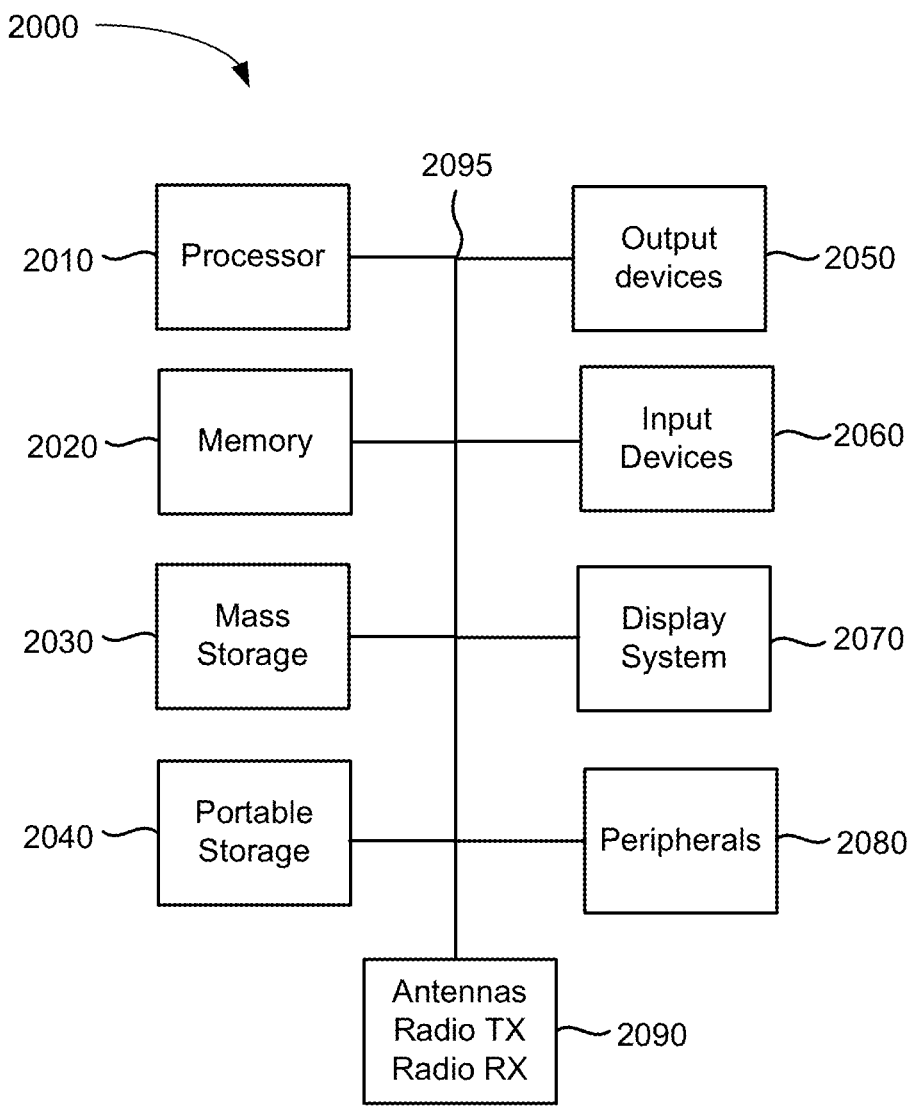
FIG. 20 is a block diagram of an exemplary system for implementing the present technology.

FIG. 20 is a block diagram of a computer system 400 for implementing the present technology. System 2000 of FIG. 20 may be implemented in the contexts of the likes of client 110, mobile device 120, computing device 130, network server 150, application server 160, and data store 170.

The computing system 2000 of FIG. 20 includes one or more processors 2010 and memory 2020. Main memory 2020 stores, in part, instructions and data for execution by processor 2010. Main memory 2010 can store the executable code when in operation. The system 2000 of FIG. 20 further includes a mass storage device 2030, portable storage medium drive(s) 2040, output devices 2050, user input devices 2060, a graphics display 2070, and peripheral devices 2080.

The components shown in FIG. 20 are depicted as being connected via a single bus 2090. However, the components may be connected through one or more data transport means. For example, processor unit 2010 and main memory 2020 may be connected via a local microprocessor bus, and the mass storage device 2030, peripheral device(s) 2080, portable or remote storage device 2040, and display system 2070 may be connected via one or more input/output (I/O) buses.

Mass storage device 2030, which may be implemented with a magnetic disk drive or an optical disk drive, is a non-volatile storage device for storing data and instructions for use by processor unit 2010. Mass storage device 2030 can store the system software for implementing embodiments of the present invention for purposes of loading that software into main memory 620.

Portable storage device 2040 operates in conjunction with a portable non-volatile storage medium, such as a compact disk, digital video disk, magnetic disk, flash storage, etc. to input and output data and code to and from the computer system 2000 of FIG. 20. The system software for implementing embodiments of the present invention may be stored on such a portable medium and input to the computer system 2000 via the portable storage device 2040.

Input devices 2060 provide a portion of a user interface. Input devices 2060 may include an alpha-numeric keypad, such as a keyboard, for inputting alpha-numeric and other information, or a pointing device, such as a mouse, a trackball, stylus, or cursor direction keys. Additionally, the system 2000 as shown in FIG. 20 includes output devices 2050. Examples of suitable output devices include speakers, printers, network interfaces, and monitors.

Display system 2070 may include a liquid crystal display (LCD), LED display, touch display, or other suitable display device. Display system 2070 receives textual and graphical information, and processes the information for output to the display device. Display system may receive input through a touch display and transmit the received input for storage or further processing.

Peripherals 2080 may include any type of computer support device to add additional functionality to the computer system. For example, peripheral device(s) 2080 may include a modem or a router.

The components contained in the computer system 2000 of FIG. 20 can include a personal computer, hand held computing device, tablet computer, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS or iOS, Android, and other suitable operating systems, including mobile versions.

When implementing a mobile device such as smart phone or tablet computer, or any other computing device that communicates wirelessly, the computer system 2000 of FIG. 20 may include one or more antennas, radios, and other circuitry for communicating via wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for expanding a dialogue system, comprising:
    displaying, to a human annotator via an annotation interface, a dialogue including a user utterance and a candidate action defining one or more computer-implemented steps to be performed responsive to the user utterance, the dialogue accessed from an application executing on a server computer, the candidate action provided by a learning model, and the candidate action including an error in a particular computer-implemented step of the one or more computer-implemented steps of the candidate action to be performed responsive to the user utterance;
    receiving, from the human annotator via the annotation interface, an annotated action that corrects the error in the particular computer-implemented step of the candidate action by specifying a fix to the particular computer-implemented step;
    maintaining a representation of a dialogue state on the server computer, the dialogue state including the utterance and the annotated action; and
    training the learning model based on the utterance, the annotated action, and the representation of the dialogue state.

2. The method of claim 1, wherein the training includes defining one or more features on input based on detected relevant state portions.

3. The method of claim 1, wherein the error is a constraint violation.

4. The method of claim 3, further comprising generating a question to submit to the human annotator based on the constraint violation.

5. The method of claim 1, wherein the training includes inducing business logic rules from data.

6. The method of claim 1, wherein the training includes inserting rules based on grammar induction.

7. The method of claim 1, wherein the training includes inserting tags into the dialogue.

8. The method of claim 1, wherein the training includes performing a dialogue check on the dialogue.

9. The method of claim 1, wherein the training includes marginalizing actions over an equivalent action.

10. The method of claim 1, further comprising displaying the representation of the dialogue state within the annotation interface, the representation of the dialogue state updated based on the annotated action received from the human annotator.

11. A computer readable storage device having embodied thereon a program, the program being executable by a processor to perform a method for expanding a dialogue system, the method comprising:
    displaying, to a human annotator via an annotation interface, a dialogue including a user utterance and a candidate action defining one or more computer-implemented steps to be performed responsive to the user utterance, the dialogue accessed from an application executing on a server computer, the candidate action provided by a learning model, and the candidate action including an error in a particular computer-implemented step of the one or more computer-implemented steps of the candidate action to be performed responsive to the user utterance;
    receiving, from the human annotator via the annotation interface, an annotated action that corrects the error in the particular computer-implemented step of the candidate action by specifying a fix to the particular computer-implemented step;
    maintaining a representation of a dialogue state on the server computer, the dialogue state including the utterance and the annotated action; and
    training the learning model based on the utterance, the annotated action, and the representation of the dialogue state.

12. The computer readable storage device of claim 11, wherein the training includes defining one or more features on input based on detected relevant state portions.

13. The computer readable storage device of claim 11, wherein the error is a constraint violation.

14. The computer readable storage device of claim 13, further comprising generating a question to submit to the human annotator based on the constraint violation.

15. The computer readable storage device of claim 11, wherein the training includes inducing business logic rules from data.

16. The computer readable storage device of claim 11, wherein the training includes inserting rules based on grammar induction.

17. The computer readable storage device of claim 11, wherein the training includes inserting tags into the dialogue.

18. The computer readable storage device of claim 11, wherein the training includes performing a dialogue check on the dialogue.

19. The computer readable storage device of claim 11, wherein the training includes marginalizing actions over an equivalent action.

20. A system for expanding a dialogue system, comprising:
    a processor;
    memory; and
    one or more modules stored in memory and executable by the processor to:
        display, to a human annotator via an annotation interface, a dialogue including a user utterance and a candidate action defining one or more computer-implemented steps to be performed responsive to the user utterance, the dialogue accessed from an application executing on a server computer, the candidate action provided by a learning model, and the candidate action including an error in a particular computer-implemented step of the one or more computer-implemented steps of the candidate action to be performed responsive to the user utterance;

receive, from the human annotator via the annotation interface, an annotated action that corrects the error in the particular computer-implemented step of the candidate action by specifying a fix to the particular computer-implemented step;

maintain a representation of a dialogue state on the server computer, the dialogue state including the utterance and the annotated action; and train the learning model based on the utterance, the annotated action, and the representation of the dialogue state.

* * * * *